United States Patent [19]
Müller

[11] Patent Number: 6,056,609
[45] Date of Patent: May 2, 2000

[54] ADJUSTABLE-PITCH PROPELLER, ESPECIALLY FOR SPORT BOATS

[76] Inventor: Peter Müller, Isengrund 9, CH-8134 Adliswil, Switzerland

[21] Appl. No.: 09/146,684

[22] Filed: Sep. 3, 1998

[30] Foreign Application Priority Data

Dec. 16, 1997 [DE] Germany .......................... 197 55 825

[51] Int. Cl.[7] ........................................ B63H 3/00
[52] U.S. Cl. ............................................. 440/50; 416/153
[58] Field of Search .................................. 440/50; 416/1, 416/46, 89, 153

[56] References Cited

U.S. PATENT DOCUMENTS 2,515,607  7/1950  Miller ......................................... 440/50
5,611,665  3/1997  Angel ........................................... 416/1

FOREIGN PATENT DOCUMENTS 1921337  4/1969  Germany .

*Primary Examiner*—Jesus D. Sotelo
*Attorney, Agent, or Firm*—Herbert Dubno

[57] ABSTRACT

The positions of blade members on a hub of a propeller for a sport boat is determined by replaceable keys or plates fitted into openings of corresponding shape and having differently located bores determining the pitch setting. The recess can be in the seat of the hub directly or in a blade carrier plate which can be mounted on the hub.

12 Claims, 4 Drawing Sheets

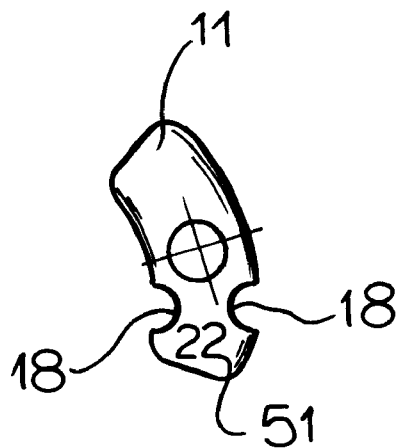
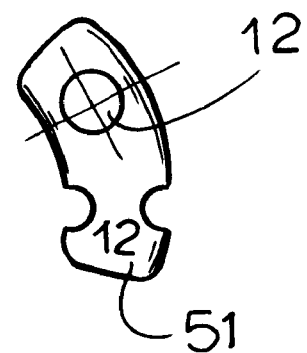
FIG.5        FIG.6
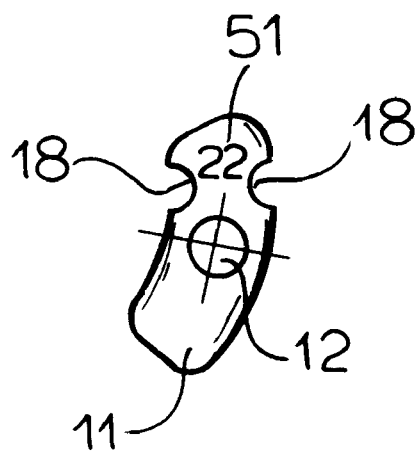
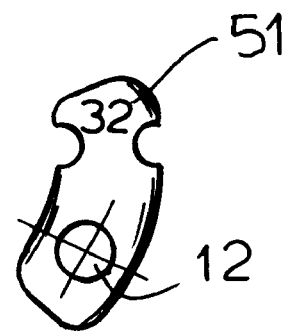
FIG.7        FIG.8

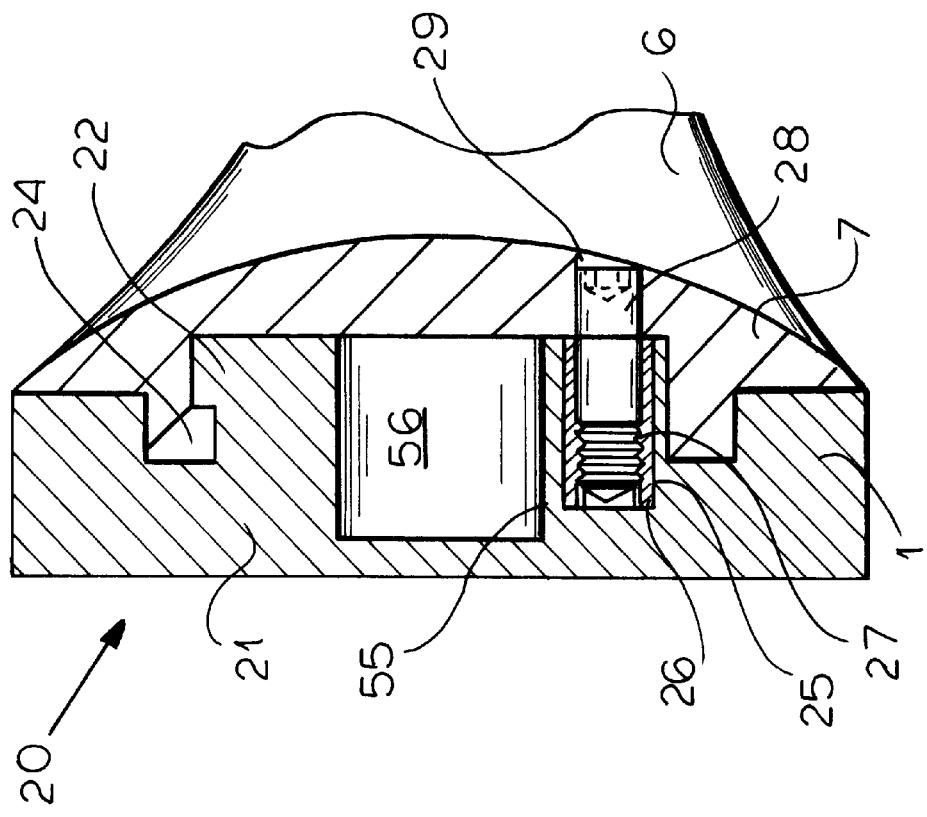
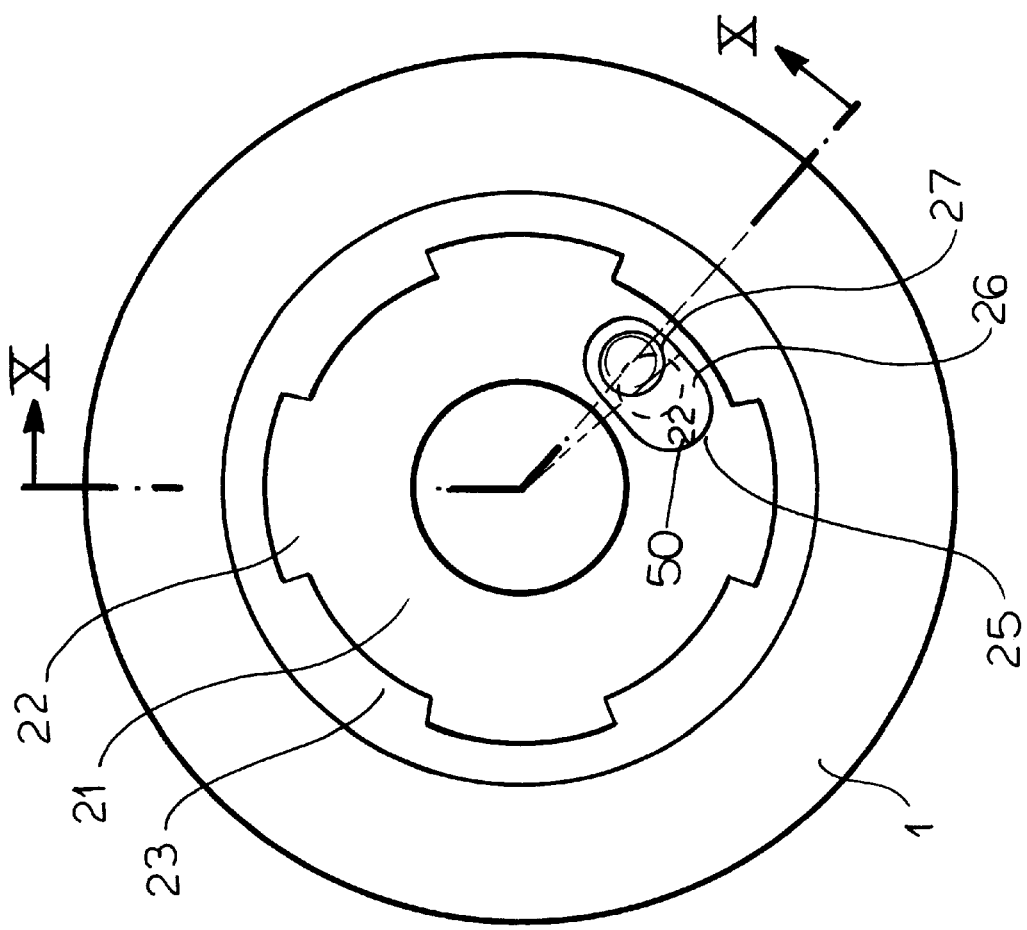

ADJUSTABLE-PITCH PROPELLER, ESPECIALLY FOR SPORT BOATS

FIELD OF THE INVENTION

My present invention relates to a propeller for a watercraft and, more particularly, to a propeller which enables the pitch of the blades to be adjusted to suit the needs for the particular watercraft. In particular, the invention relates to a propeller, especially for a sport boat, which allows selection of the particular pitch for a fixed-blade type of propeller.

BACKGROUND OF THE INVENTION

An adjustable pitch propeller for a watercraft can comprise a hub and a plurality of blades which are fixed on the hub but which allows adjustment of each blade about a blade axis to permit selection of the pitch thereof.

In the German patent document DE-AS 19 21 337, such a propeller is described in which each blade has a disk-shaped base which is centered in a seat of the hub, the angular position of the blade with respect to an axis thereof being selected by the engagement of a positioning pin extending downwardly from the seat in a selected registering hull of the blade base.

To allow selection of the angular position of the blade about the centering pin or boss and thus about the respective blade axis, the blade base has a multiplicity of registering bores, generally distributed in concentric circles or segments of a circle. Each registering bore can be brought into registry with a bore or hull of the seat so that a positioning pin can be inserted into the aligned or registered bores to thereby fix the pitch of the particular blade. The fastening of the blade base to the hub can then be effected by screws or bolts which can pass through elongated holes or slots in the blade base and can be threaded into internally threaded bores of the hub or seat.

Ship propellers of this type generally have only a limited possibility for adjustment of the blade pitch to accommodate different operating conditions.

However, for many types of sports watercraft, yachts and the like, hereinafter referred to as sport boats, utilizing a motor drive, it is found that a specific propeller pitch must be matched with the drive motor. This can pose a significant problem, especially where the propeller has only a limited capacity for pitch adjustment. In fact, it is found that the pitch of the propeller can have a significant effect on the engine speed so that, for example, a pitch change of about 1 mm which can correspond to a change in the angular orientation of each blade by about 1°, can result in a change in the engine speed of up to 200 revolutions per minute (RPM).

If one wishes, therefore, to design a standardized boat propeller which can be employed for a wide variety of engine speeds and sport boat requirements, utilizing a hub and propeller blades angularly adjustable on respective seats of the hub about respective axes transverse to the rotation axis of the hub, it is found that each blade base and the respective seat of the hub must be provided with about 30 registering bores to allow coverage of all of the possible desirable blade pitches for the propeller.

Furthermore, because of the large number of registration bores there is always the danger that an incorrect bore will be selected for the pitch adjustment and thus that the blades of the propeller might not be properly matched with one another or an incorrect pitch might be selected. Furthermore, fabrication of the blades is rendered complex because of the large number of bores which may be necessary and the requirement that they be precisely located on the propeller base. In many instances, the blade base simply cannot accommodate the large number of bores which may be required.

OBJECTS OF THE INVENTION

It is therefore the principal object of the present invention to provide an improved propeller for sport boats and other watercraft, which allows adjustment and setting of the blade pitch, whereby the drawbacks of earlier systems are obviated.

It is another object of this invention to provide the improved propeller for the purposes described which reduces the fabrication complexity of the propeller blade as well as the danger of misadjustment of the blades, while nevertheless permitting the propeller to accommodate all possible desired pitches.

Yet another object of the invention is to provide a propeller, especially for a sport boat, that permits economical fabrication of the propeller hub, independently of the particular propeller pitch which may be required, and a standardized fabrication of the propeller blades so that, even for the nonexpert, accurate pitch adjustment is possible by the use of the improved blades and hub.

SUMMARY OF THE INVENTION

These objects and others which will become apparent hereinafter are attained, in accordance with the invention by providing each blade base with a recess in which a positioning key can be received to establish the angular position of that blade about the adjustment axis, the positioning key being in the form of a small plate having the registering bore or hull previously described and in which the positioning pin can be engaged. The blade base is so received in the seat that the plate can be engaged in the recess with precision and can fix the pitch of that blade and hence the angular orientation of the blade about the adjustment axis. With the pitch determined by the small plate or key, the base of the blades can be secured, preferably by screws, to the hub.

According to the invention, therefore, the hub is provided with respective blade carriers in the seats provided in the hub, each blade carrier being angularly adjustable in the seat and being fixed therein by a pin which, in turn, is received in a key in the form of a small plate whose length, shape or size, determines the orientation of that blade carrier in the seat, the blade carrier being affixed by screws or the like to the base of the blade. The blade carrier in turn can be held in the seat by a locking ring having an external screw thread which engages an internal thread of the respective seat.

According to a further feature of the invention, the base of the blade has a boss or pin which centers that blade with respect to the blade carrier which has a central bore or recess in which the boss or pin is received. Of course, if desired, the blade carrier can be provided with the boss or pin while the base of the blade can have a recess centering blade on that boss or pin.

For different angular adjustments of the blade relative to the seat, different keys or plates can be used. Each such plate or key can be provided with indicia indicating the angular setting of the blade contributed by that pitch key or plate, e.g. in an alphanumeric information set. By selection of a certain plate or key, even an unskilled worker can accurately set the blade pitch which is required or desired.

Preferably the recesses of the blade base and the plates or keys can have a symmetrical outline. In this case each plate or key can provide two different plate pitches. From a practical point of view, however, it has been found to be desirable to provide the recess of the blade base and the plates or keys so that they have circular segmental configurations and to provide the recess along the edge of the blade base and preferably so that it is open outwardly. This facilitates machining of the blade base.

A direct machining of the blade base can be avoided by, as noted previously, mounting the blade base on a blade carrier which is provided with the recess in which the pitch key or plate is received.

According to another feature of the invention, the blade carrier is fastened in the seat by the blade carrier ring whose external thread engages in the internal thread of the wall of the seat. Alternatively, the blade carrier may be held in place by a spring ring which engages in a groove in the wall of the seat. The pitch keys or plates themselves can have indentations along the inner and outer peripheries enabling them to be engaged by a pair of pliers or the like.

BRIEF DESCRIPTION OF THE DRAWING

The above and other objects, features, and advantages will become more readily apparent from the following description, reference being made to the accompanying drawing in which:

FIGS. 5–8 are plan views of a set of pitch keys which can be used in accordance with the invention;

FIG. 9 is a view similar to FIG. 4 showing a seat for the base of one of the blades; and FIG. 10 is a section taken along the line X—X through the base of the latter blade and its seat in the hub.

SPECIFIC DESCRIPTION

Figure 3:
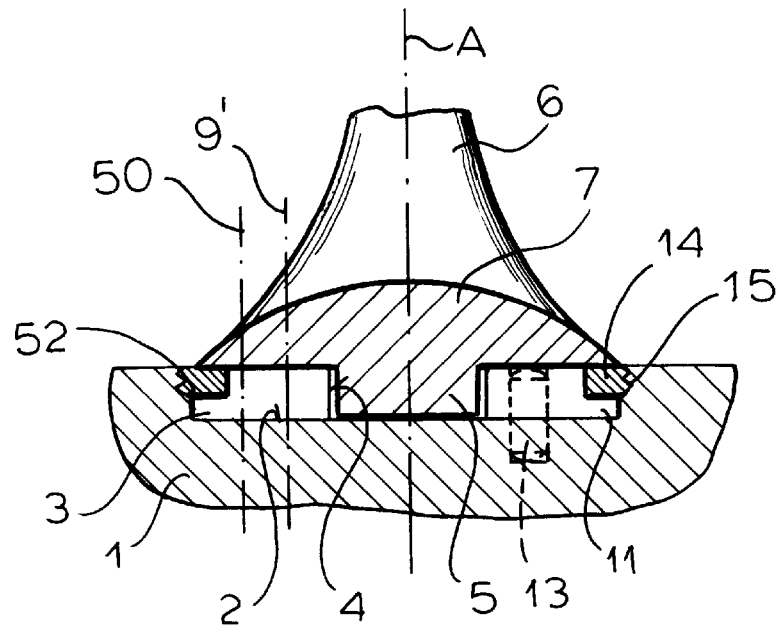
FIG. 3 is a cross section through a propeller assembly in the position of the plate of FIG. 2.

As can be seen from FIG. 3, a hub 1 for a propeller, which has not been shown in greater detail, can be rotated about the propeller axis and has a plurality of propeller blades 6, (only one of which is visible in FIG. 3) angularly equispaced about the rotation axis of the hub and each of which is angularly adjustable about a generally radial axis A which is perpendicular to the axis of rotation of the hub.

While three such blades in angularly equispaced relationship are preferred, every propeller according to the invention must have at least two such blades. Such propellers are used for sport boats.

Along the periphery of the hub 1, a number of seats 2 are formed equal to the number of propeller blades and hence the hub must have at least two such seats. The seats are of circular configuration and are centered on the respective axes A.

Figure 1:
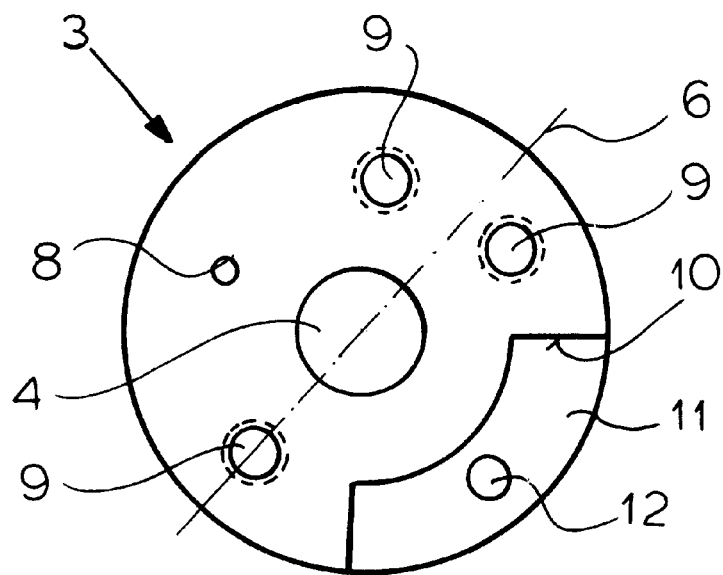
FIG. 1 is a plan view of the underside of an adjusting or blade-carrying plate for a propeller according to the invention.
Figure 2:
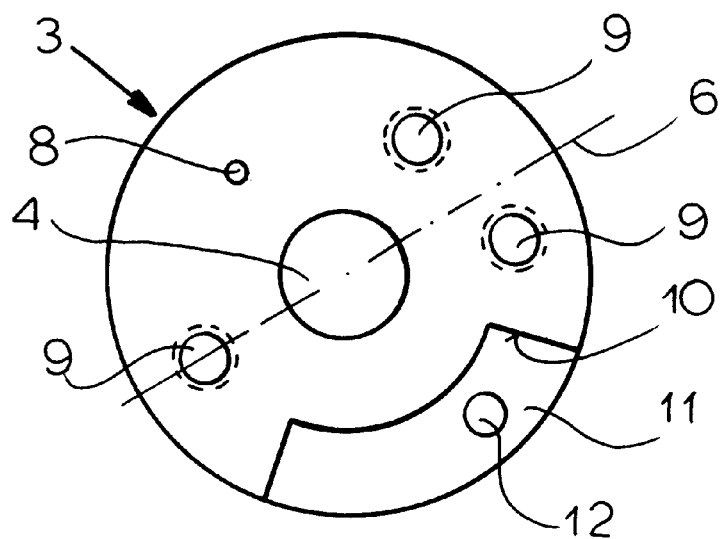
FIG. 2 is a view similar to FIG. 1 of a plate in another position.

In the embodiment of FIGS. 1–3, each of the seats 2 receives an adjustment plate whose diameter corresponds to the diameter of the seat 2 and whose thickness corresponds substantially to the depth of the seat 2. The adjustment plates 3 have central centering openings 4 in which centering pins 5 on the base of each blade 6 can be received. The base of the blade has been represented generally at 7.

The blade base 7 and the adjustment plate 3 are each provided with an aligning bore 8 for an aligning pin which can pass through these bores and can affix the base of the propeller blade to the respective adjustment plate with a high degree of positional accuracy. The pin has been represented by the dot-dash line 50 in FIG. 3. In addition, the base 7 of each blade can be secured to the blade by means of screws 9' which can be threaded into internally threaded bores 9 of the adjustment plate 3 and can pass through holes in the base of the blade.

According to the invention, the adjustment plate 3 has a peripheral opening or cutout 10 which has a circular arc segmental configuration. Within the opening 10, a pitch-setting key or plate 11 can be inserted, the plate 11 having the same outline as the recess and preferably the same thickness as the adjustment plate 3. The plates 11 each have an aligning bore 12 in which a pin 13, extending upwardly from the floor of the seat, can engage to position the adjustment plate 3 fixedly in the seat 2.

As FIGS. 1 and 2 make clear, when different plates 11 are inserted into the recess 10, since the aligning holes 12 are located in different positions as to the outline of the respective key, the adjustment plate 3 will assume different angular positions about the respective axis A.

The individual key can have markings such as have been shown in FIGS. 5–8 at 51 to represent the pitch setting associated with the use of the respective key. The keys 11 can have symmetrical outlines so that they can be inverted through 180° and can be employed for different pitch settings.

In assembly of the unit, the adjustment plate 3 is first inserted into the recess 2 of the hub 1 and the respective key 11 for the desired pitch setting is inserted into the recess 10. The adjustment plate 3 is then so displaced that the pin 13 extending upwardly from the seat can engage in the aligning hole 12 of the respective plate. The adjustment plate can then be fastened by screws in the seat. An externally threaded ring can then be screwed into the outer wall of the seat 2 in a peripheral notch 52 along the periphery of the ring 3. That secures the ring or plate 3 in the seat, rotation about the axis A being prevented by the pin 13. The ring 14 has an external screw thread matching the internal screw thread in the wall of the seat 2. The base 7 of the propeller 6 can then be mounted by centering its pin 5 in the opening 4 and by inserting the alignment pin 50 through the bores 8 of the base 7 and the ring or plate 3.

Bolts 9' can affix the blade to the ring, plate or disk 3 as required.

Figure 4:
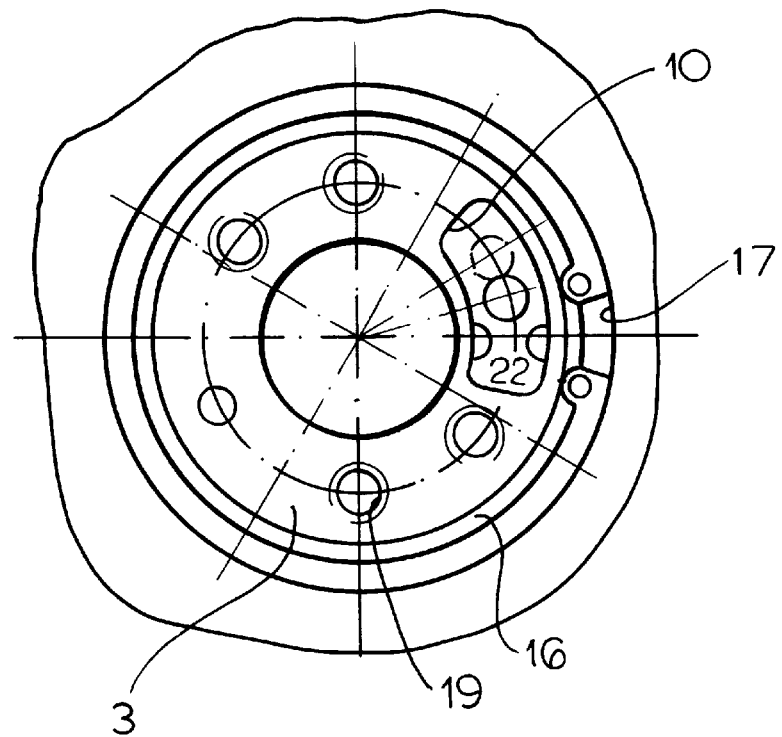
FIG. 4 is a radial section through a propeller hub.

FIG. 4 shows that the blade carrier 3, once it is positioned in the seat, can be held in place by a spring ring 16 which can jump into an internal groove in the wall of the seat. The base 7 can be attached to the adjustment ring 3 via screws as has been described in connection with FIGS. 1–3, the screws being inserted into the thread bores 19.

As FIGS. 5–8 make clear, the pitch keys 11 can have the configuration of the cutout 10 in the plate 3 and can have their pin holes 12 at different locations, depending upon the pitch adjustment. The keys also can have notches or recesses 18 to enable a pair of pliers to be used for inserting or removing the pitch keys.

FIGS. 9 and 10 illustrate another embodiment of the invention wherein blade-carrying plates, disks or rings are not used. Here the hub 1 can be formed unitarily with three angularly equispaced seats 20 along the periphery of the hub, each of the seats 20 being engageable by a respective base 7 of a propeller blade 6. Each seat 20 here is formed unitarily with a central pin 21 and each pin 21 can have four radially outwardly extending lugs or jaws 22. Between the jaws 22 there are provided free spaces 23.

Each propeller base 7 has four inwardly directed projections 24 which can be inserted into the spaces 23 upon a radial mounting of the blade base upon the pin 21.

The seat 20 has a central recess 55 in which a pin 56 of the base 7 can engage. In addition, the pin 21 of each seat can be formed with a recess or slot 25 in which a key 26 can be inserted. Each key 26 has a cross section which is similar to that of the slot 25 and has a threaded bore 27 located variously, depending upon the pitch setting to be achieved with that key. The height of the key 26 can correspond to the depth of the recess 25.

A centering pin 28 can be threaded into the bore 27 and can be received in an aligning hole 29 of the base 7 of the propeller blade 6. A full set of keys 26 can be provided for all of the possible settings of the blade pitch and each key can have indicia 50 representing the pitch setting.

Once the propeller blade base is engaged with the pin 21 in a bayonet connection, the bore 29 is aligned with the threaded bore 27 of the selected key and the pin 28 inserted. The pin 28 prevents angular shifting of the blade 6 relative to the seat 20 and hence the hub. Radial separation is prevented by the bayonet connection. The pin 28, therefore, need only take up shear forces.

I claim:

1. A propeller with adjustable blade pitch, comprising:
   a hub formed with at least one seat;
   a propeller blade having a base receivable in said seat and formed with a recess;
   at least one key receivable in said recess and formed with a bore; and
   a pin projecting outwardly from said seat and engageable in said bore for positioning the blade relative to said seat at an angular position corresponding to a pitch determined by said key.

2. The propeller defined in claim 1 wherein said key has an outline corresponding to an outline of said recess.

3. The propeller defined in claim 1 wherein said key forms one of a set of keys having a common outline and bores positioned differently in said keys.

4. The propeller defined in claim 1 wherein said recess and said key have symmetrical outlines enabling inversion of said key in said recess.

5. The propeller defined in claim 1 wherein said recesses are of circular arc segmental configuration.

6. The propeller defined in claim 1 wherein said recess is provided at an edge of said base.

7. The propeller defined in claim 1, further comprising an adjustment plate received in said seat and connected to said base, said recesses being formed in said adjustment plate.

8. The propeller defined in claim 7 wherein said adjustment plate is secured in said seat by an externally-threaded clamping ring screwed into an internal thread along an inner wall of said seat.

9. The propeller defined in claim 7 wherein said adjustment plate is secured in said seat by a spring ring engaged in an internally-open circumferential groove formed in a wall of said seat.

10. The propeller defined in claim 1 wherein said key is provided with recesses along opposite edges thereof for engagement by a pair of pliers.

11. A propeller, especially for a sport boat, comprising:
    a hub formed with a blade support seat;
    a blade member secured to said blade support seat, said blade support seat having a first formation and said blade member having a second formation mating with said first formation, one of said formations comprising at least two claws extending inwardly relative to a respective radial axis about which said blade member is angularly adjustable and angularly spaced therewith, the other of said formations being provided with at least two claws extending outwardly relative to said axis and engageable with said claws of said first formation in a bayonet connection upon angular displacement of said blade member relative to said seat;
    a recess formed in one of the formations;
    a key received in said recess and provided with a threaded bore; and
    a pin threaded into said bore and engaged in a hole in the other of said formations.

12. The propeller defined in claim 11 wherein said key is one of a set of keys having the same outline with respective bores in different positions.

* * * * *